United States Patent [15] 3,695,643
Schmunk [45] Oct. 3, 1972

[54] CORRUGATED TUBE COUPLING MEANS

[72] Inventor: John D. Schmunk, Findlay, Ohio
[73] Assignee: The Hancock Brick & Tile Company, Findlay, Ohio
[22] Filed: May 18, 1970
[21] Appl. No.: 38,437

[52] U.S. Cl. ............285/156, 285/235, 285/417, 285/423, 285/DIG. 4
[51] Int. Cl. ...................F16l 21/00, F16l 41/00
[58] Field of Search........285/7, 226, 235, 260, 304, 285/305, 317, 417, 424, DIG. 4, DIG. 21, 156; 138/121, 122; 61/16

[56] References Cited

UNITED STATES PATENTS

| | | | |
|---|---|---|---|
| 1,324,602 | 12/1919 | Lorenz | 285/305 X |
| 2,524,629 | 10/1950 | Liedtke | 285/226 X |
| 3,212,799 | 10/1965 | Rice | 285/235 |
| 3,239,254 | 3/1966 | Campbell | 285/424 X |
| 3,317,087 | 5/1967 | Landis | 285/235 X |

FOREIGN PATENTS OR APPLICATIONS 6,802,270  8/1968  Netherlands ...........285/226

Primary Examiner—D. J. Williamowsky
Assistant Examiner—David H. Corbin
Attorney—Thomas D. Shaffner

[57] ABSTRACT

A thermoplastic coupling for corrugated plastic tubing having an elongated generally cylindrical body and mouth at either end. The inside diameter of the cylindrical body approximates the outside major diameter of the corrugated tubing. Cleats along the inner circumference of the mouth have inwardly directed vertical faces and inwardly converging camming surfaces in order to permit the tubing to enter the coupling but impede its removal. Optionally the coupling may have a corrugated body. Where the coupling feature of this invention is employed in connection with a fitting such as a Tee it is preferred that the body be corrugated. A Tee coupling may be formed by including a branch which protrudes outwardly from the side of and in fluid communication with the cylindrical coupling body.

8 Claims, 6 Drawing Figures

INVENTOR.
JOHN D. SCHMUNK
BY
Fay, Sharpe & Mulholland
ATTORNEYS

INVENTOR.
JOHN D. SCHMUNK
BY
Fay, Sharpe & Mulholland
ATTORNEYS

CORRUGATED TUBE COUPLING MEANS

BACKGROUND OF THE INVENTION

When drainage systems comprised of sections of corrugated plastic tubing are laid it is necessary to connect adjoining sections by couplings. The ideal coupling should be inexpensive, assemble easily, hold securely, and not require any special modifications of the tube ends. Simplicity of assembly is particularly important. Any complicated or critical connections with the tubing requires unnecessary labor and may result in a faulty connection which will separate when covered with soil. Soil may then enter the line and block it.

Simplicity of assembly also reduces the time necessary to lay the drainage tile and therefore its effective cost. If a number of manipulations are necessary to physically connect a coupling and a drainage line it naturally takes longer than one similar action. For example, if it is necessary to put some type of seal between the parts and then connect them it will take longer than simply connecting them. Ideally, the parts should be connected by simply inserting one into the other.

It is also highly preferable if different lengths of tubing can be inserted into the mouth of the coupling while maintaining a secure connection. If a specific length of the tubing has to be inserted into the mouth of the coupling it will be often necessary in connection with a system which is made up, to cut the tubing or rearrange the entire system in order to attain the specific insertion length required. The additional time and labor required to fit the tubing naturally adds to the cost and would undoubtedly result in some failures.

Various types of couplings have been suggested for both smooth and corrugated tubing. Couplings used with smooth walled tubing have a particular problem since there is inherently no convenient means to provide a mechanical interlock between the fitting and the tubing. Snap on couplings for smooth wall tubing require a recess or extension to be specially formed in the tubing to provide a complimentary part of the interlock. This special modification of ordinary smooth walled tubing reduces the thickness and therefore the strength of the tubing at the recess. The increased possibility of failure from the thin section is clearly not desirable.

The modified smooth walled tubing will normally only have a single recess at a set distance from the mouth. This structure has the inherent problem of requiring an exact length of tubing to be inserted into the coupling. As discussed earlier, specific length requirements result in a higher frequency of defects and improper connections. An example of a coupling for smooth walled tubing having a recess spaced from the mouth and the above noted disadvantage is illustrated in U.S. Pat. NO. 2,452,219 to K. L. Bergvall et al.

Frictional engagements have been used with some success but always have the potential danger of simply being pulled apart. An example of a coupling for smooth wall tubing is shown in Singer's U.S. Pat. No. 2,967,067. Singer uses teeth or rib like projections to grasp the smooth wall of a tube. It is inherently based on a frictional engagement which can fail.

A coupling for corrugated tubing is shown in the Draudt U.S. Pat. No. 3,167,330 which utilizes a relatively complicated mechanism for vacuum cleaner hoses. One section of the Draudt coupling is formed to match the crest and roots of a specific corrugated tubing. Any change in the corrugation's height or spacing would make a mismatch with the coupling. That is, the coupling is designed for one specific set of measured corrugations. The Draudt coupling would simply not be feasible on drainage tile with various types of corrugations.

This invention provides the advantages of an easily assembled coupling which securely holds corrugated tubing by means of a mechanical interlock. This invention does not require a specific insertion length of the tubing into the coupling nor does it require any modification of the tubing end. Further, this invention is easily adaptable to other fittings such as Tees, elbows, etc. without the necessity of employing ancillary fastening means. Moreover, the coupling of this invention can accept corrugated tubing having widely varying corrugation spacing the corrugation depth. It is only necessary that the effective diameter defined by the radially inwardly projecting cleats by slightly smaller than the major outside diameter of the corrugated tube. In this way the deformable inclined cleats inside the coupling acts as a mechanical obstruction to the separation of the tubing from the coupling.

The coupling of this invention also has the feature of permitting the tubing to rotate with respect to the fitting. This is advantageous in that the completed system will be in a stress free condition without any torque existing. In view of the particular application for which this fitting is intended, namely drainage systems, it is not necessary that the connection be fluid tight. In fact it is advantageous if the connection is not fluid tight so that ingress of liquid is allowed.

SUMMARY OF THE INVENTION

This invention relates to a thermoplastic coupling for corrugated plastic tubing including an elongated generally cylindrical body have a mouth. The diameter of the cylindrical body and the diameter of the tubing are elected to permit the corrugated tubing to enter the cylindrical body. A means for permitting the corrugated tubing to pass into the coupling but impeding its removal includes inclined cleats which are adapted to engage and hold corrugations on the tubing.

PREFERRED EMBODIMENT

Figure 1:
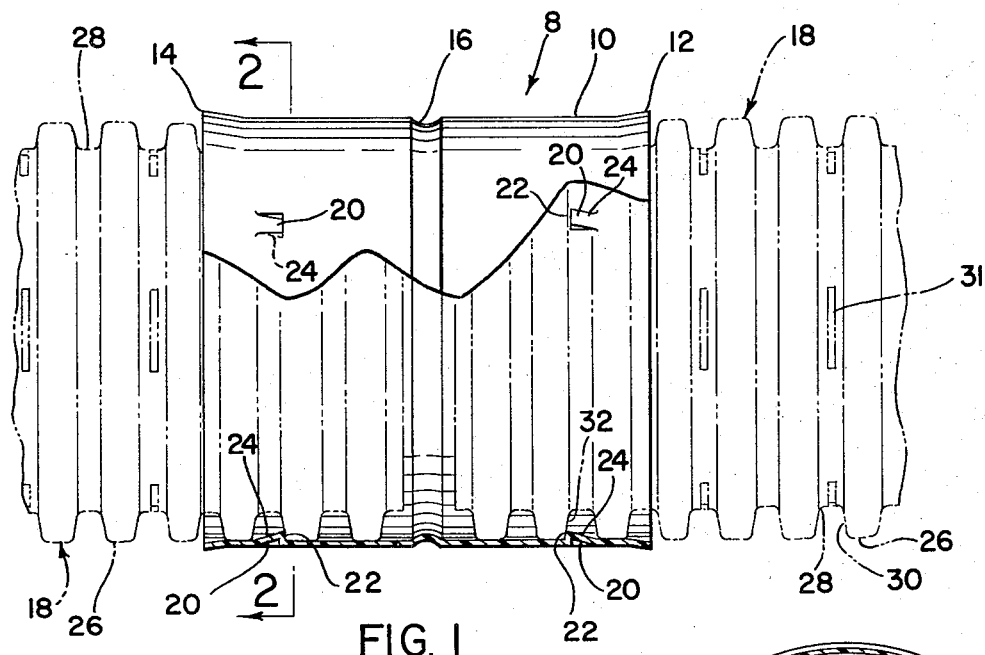
FIG. 1 is a side plan view partially cut away of the coupling of this invention.
Figure 2:
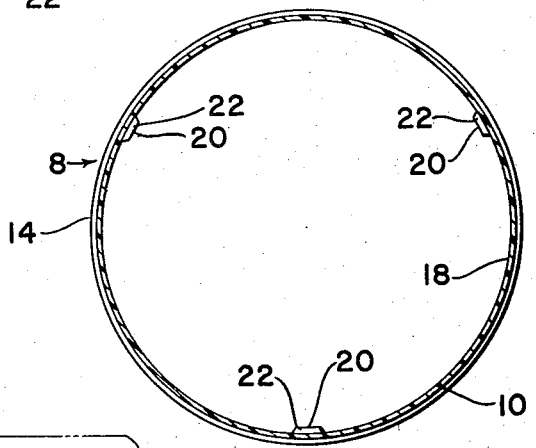
FIG. 2 is a section taken through 2—2 of FIG. 1 and is a cross section of the coupling with tubing inserted therein.

FIGS. 1 and 2 illustrate a preferred embodiment of the coupling 8 of this invention which has a generally cylindrical body 10 with flared mouths 12 and 14 at either end. An annular indentation 16 traverses the circumference of the coupling preferably equidistant from the mouths. The flared mouths 12 and 14 are constricted inwardly to form an inside diameter slightly greater than the major outside diameter of the corrugated tubing 18. The particular angle of incline of the surface of the mouth is not at all critical but it has been found that an angle of 5°–15° will allow the corrugated tubing 18 to easily enter the mouth. It is preferred in many cases to employ a flared mouth but this feature is not essential to the invention and couplings as well as fittings without a flared mouth serve quite satisfactorily (see FIG. 3).

Protruding radially inwardly from the cylindrical body 10 of the coupling are a plurality of cleats 20. The cleats 20 are generally arranged at a common vertical plane about the inner periphery or circumference of the coupling 8. They have inwardly directed generally vertical or steep angle locking faces 22 and outwardly and upwardly directed camming faces 24 joined thereto to form a type of ramp. The cleats 20 are axially positioned between the mouth and the center of the coupling 8. It is desirable that the cleats are located in the area of the mouth to enable them to engage corrugations of the tubing soon after entering the coupling. In this manner only a minimum of length of tubing need protrude into the coupling 8 although a greater length may enter the coupling by having more than one corrugation pass over the cleats. If the cleats were near the center of coupling the tubing would have to protrude to nearly the center before it could engage the cleats.

The illustrated tubing 18 has corrugations for purposes of strength, flexibility and generally utility. The corrugated tubing 18 has crests 26 connected to roots 28 by means of corrugation walls 30. The walls 30 should be nearly vertical or form a large angle with the horizontal in order to abut against the faces 22 of the cleats 20. Rectangular drainage openings 31 are arranged circumferentially around the tube in alternate roots to permit ingress and egress of fluids.

There are usually at least three of the cleats 20 around the periphery of the coupling. Regardless of the number of cleats employed they should preferably be spaced symmetrically about the periphery of the coupling to retain the tubing in a centered position in the fitting. It is possible, however, to slightly stagger the axial position of the cleats. As illustrated in FIG. 2, the three cleats are equally spaced in a plane at 120° apart. If desired, however, four or more cleats can be used to secure the tubing in the coupling. In this case the four cleats should be equally spaced at a common plane 90° apart.

In order to connect the tubing with the coupling the corrugated tubing is simply pressed into the mouth 12 against the camming surfaces 24 of the cleats 20. As the tubing progresses into the coupling the camming surfaces 24 cause a relative radial movement between the corrugated tubing 18 and the coupling 10. As the tube enters the fitting there is an expansion of the mouth of the coupling, a slight contraction of the tubing and distortion of the camming face 24 of the cleat.

Figure 3:
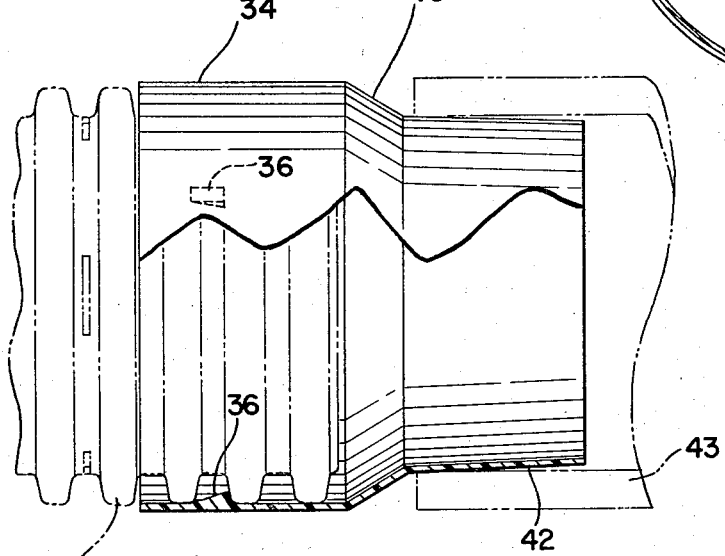
FIG. 3 is a side view partially cut away of an alternate embodiment of the invention showing a coupling which connects corrugated tubing and smooth wall tubing, such as a conventional clay tile.

To permit ease of assembly the wall thickness of the material forming the mouth of the fitting and/or the camming surface 24 may optionally be less than that of the remainder of the fitting to facilitate radial expansion. It will be recognized that this portion of the fitting which overlies the corrugated tubing is not relied upon for any significant load bearing function. The cleats are by design small enough not to cause damage during connection but large enough to engage securely the corrugations. The particular height of the locking face 22 is not critical and is dimensioned to be nearly the greatest height allowable and yet permit assembly without difficulty. One satisfactory height for the cleats has been found to be three-thirty-seconds of an inch for use in connection with tubing having one-fourth of an inch between corrugations. The camming slope 24 may also vary somewhat but 10°–20°, and more particularly about 15° has been found to work successfully. It is preferred that the projected length of the camming surfaces 24 do not exceed the distance between the corrugations so that the locking faces 22 will fully engage the wall of the corrugation and the mouth of the coupling will be in a stress free condition. If the projected length of the camming does exceed the corrugation spacing the coupling will be functional but yield less than optimum results. In this connection it should be recognized that the coupling of this invention is useful with tubing having widely differing corrugation spacing and depth. It will be recognized that the relationship between the angle of the camming face and the angle of he locking face permits the corrugated tube to enter the fitting with far less force than is required to remove the tube. The inner faces 22 of the cleats 20 are ideally nearly vertical but they need be at an angle only sufficient to retain the corrugated tubing. The cleats of FIGS. 1 and 3 are shown as being positioned inwardly from the extremity of the mouth. It will be understood that by positioning the cleats a distance inwardly of the mouth, or extending the mouth beyond the cleats the tubing will be telescoped further into the fitting. This inhibits angulation between the fitting and the tubing and in many applications produces a more secure connection. However, the cleats may optionally be positioned at the extremity of the mouth so that the camming surface nearly intersects the end.

Once an individual corrugation has passed inwardly beyond the cleats 20, and into the coupling, it is effectively impeded from moving outwardly. As shown in FIG. 1 an outwardly facing wall 32 of the corrugation engages the inwardly directed faces 22 of the cleat 20. This mechanical engagement without the benefit of any substantial camming surface will effectively prohibit the accidental removal of the tubing from the coupling.

As shown in FIG. 1, two of the corrugations have moved past the cleats 20. While it is only necessary that one of the corrugations engages the cleats 20, it is also possible to design the fitting so that three or more of the corrugations could pass the cleats 20. This flexibility in the length of tubing that may be received into the coupling reduces the criticality of the length of tubing in the system. Preferably the distance between the locking face 22 and the wall of the annular abutment 16 is selected to be approximately a multiple of the corrugation spacing but this feature is not necessarily essential to the invention.

The coupling is preferably made of a semi-rigid polymeric material such as polyethylene, polypropylene, polyvinylchloride, etc. It is clearly necessary that at least the mouth of the fitting have some resiliency to facilitate assembly.

The annular indentation 16 near the center of the coupling arrests the inward movement of the tubing 18. This indentation acts as a maximum gauging means. Since the principal function of the annular abutment 16, as well as the wall of the first corrugation of the embodiments discussed hereafter, is to arrest inward movement of the tubing it is preferred that the inner radial exteremity not enter the flow path as defined by the minor diameter of the corrugated tubing.

An alternate embodiment of this invention in FIG. 3 has a cylindrical body 34 with cleats 36, which act in cooperation with the corrugations 38 as described above. In this embodiment, however, a frusto conical surface 40 tapers inwardly to form a substantially cylindrical but slightly tapered body 42. The inwardly tapered section permits its insertion into a smooth member 43. The taper of the body is slight and 2° has been found generally satisfactory for the purpose of insertion. This coupling is particularly designed to connect corrugated tubing with the smooth wall pipe such as conventional clay tile.

Figure 4:
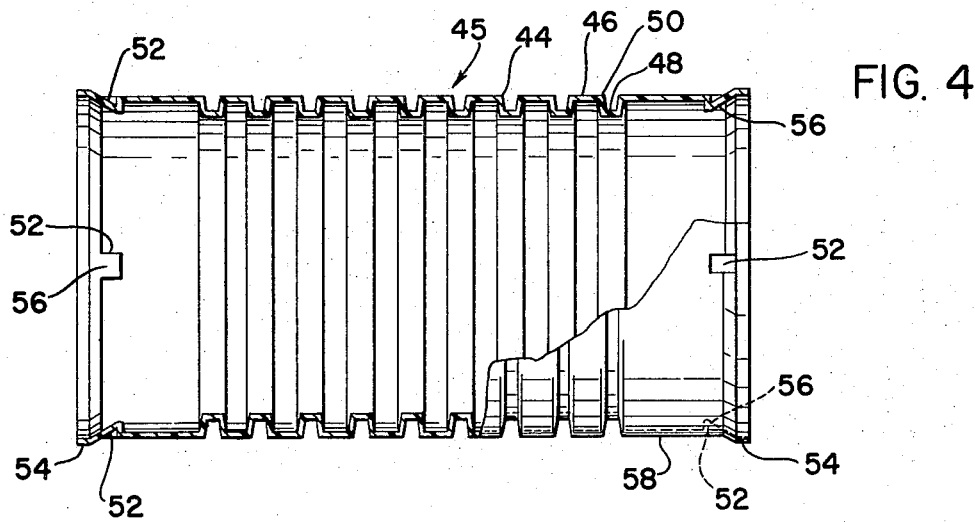
FIG. 4 is a side plan view, partially cut away of an alternate embodiment of the coupling of this invention and includes a corrugated mid-section.

FIG. 4 illustrates an embodiment of this invention in which the center portion 44 of a coupling 45 is corrugated. The corrugated section 44 has crests 46 connected to roots 48 by corrugation walls 50. The cleats 52 are again used in conjunction with a tapered mouth 54 to facilitate the insertion and connection of corrugated tubing into the coupling. In this embodiment, however, the tapered mouth forms a continuous camming surface with an inwardly converging camming surface 56 of the cleat 52. The outer diameter of the tapered mouth is illustrated as being slightly larger than major diameter of the corrugation on the tubing but this feature forms no part of the invention. This particular dimensional relationship may arise due to the manufacturing techniques employed. The corrugated coupling as shown in FIG. 4 has the particular advantage of allowing the coupling itself to bend when used to connect tow sections of tubing which are not coaxial. Additional strength and tolerance to compression and tension are also realized by using corrugations in the center section of the coupling. These advantages necessarily reduce the probability of the coupling cracking or breaking. A low failure rate of the coupling is particularly important since a broken or collapsed section must be located underground before it can be repaired or replaced.

The distance from the mouth 54 of the coupling to its first corrugation root normally governs the maximum insertion length of the tubing. The relative sizes of the coupling and tubing are such that the end of the inserted tubing abuts against the first corrugation wall in the coupling. Again, the distance between the locking face of the cleat and the first corrugation is preferably selected to be approximately a multiple of the spacing between corrugations. However, the dimensions could be varied to permit the tubing to pass within the coupling corrugations and abut against a central indentation similar to that of FIG. 1. The maximum insertion depth of the tubing is simply the distance necessary for the first corrugation to interlock with the cleats 52. Of course, more corrugations may enter the coupling if necessary by passing over the cleats.

Figure 5:
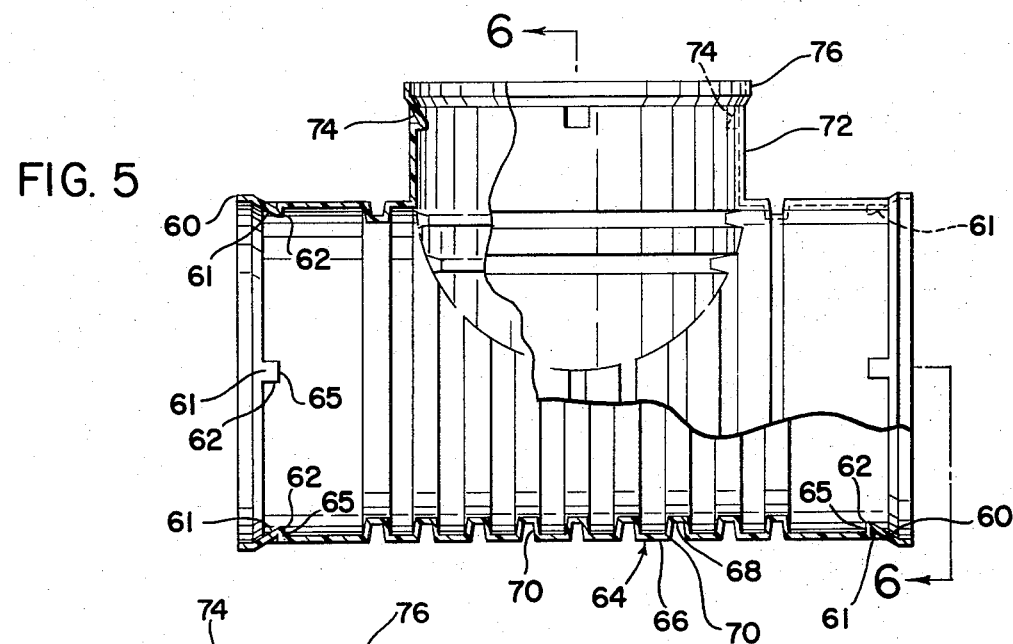
FIG. 5 is a side plan view partially cut away showing the invention adapted to a corrugated Tee fitting.
Figure 6:
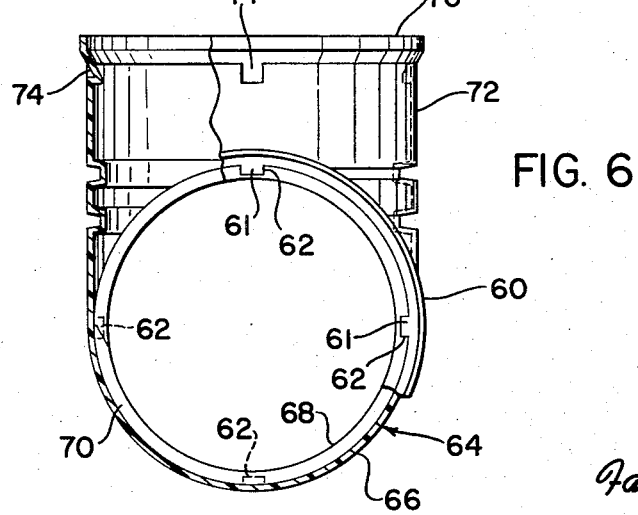
FIG. 6 is a section 6—6 taken through FIG. 5 and indicates a cross section partially cut away of a Tee coupling embodying the invention.

A Tee coupling is illustrated in FIGS. 5 and 6. Previously a Tee fitting without coupling ends had been used. With this prior art Tee fitting it was necessary to use a coupling on each of the tree ends of the incoming lines and connect them to the Tee fitting. The advantage of the Tee coupling in this situation is obvious. It eliminates the use of three separate connectors plus a Tee fitting. The Tee coupling shown in FIGS. 5 and 6 has a basic linear section similar to that illustrated in FIG. 4. In particular it has a tapered mouth 60 leading into the camming surfaces 61 on cleats 62. The cleats 62 engage corrugation walls of inserted tubing by its inwardly directed face 62. The body of the Tee coupling is formed by corrugations 64 which includes crests 66 connected to roots 68 by corrugations walls 70.

In the Tee coupling an annular cylindrical shaped conduit branch 72 extends outwardly from the side of the coupling in fluid communication therewith. Conduit branch 72 has cleats 74 with appropriate camming surfaces to cooperate with an expanded mouth 76 in the above described manner. The corrugated tubing can thus be pushed directly into the three mouths of the Tee coupling by passing over the cleats.

In short, this invention utilizes inwardly protruding cleats and a camming mouth to greatly facilitate the coupling of corrugated tubing. It provides for efficient assembly and security from inadvertent removal of unmodified corrugated tubing from the coupling.

The invention claimed is:

1. In combination, a thermoplastic tubing having corrugations along the length thereof and a thermoplastic fitting telescopically received thereupon with fluid communication therebetween, said corrugated tubing including crests and roots connected by walls, said fitting including an elongated generally cylindrical body having at least one generally smooth-walled mouth, the diameter of the mouth being slightly greater than the outside diameter of the tubing to permit the tubing to enter the mouth and be rotatable with respect thereto;

a plurality of resilient retaining means positioned axially inwardly from the extremity of the mouth and protruding radially inwardly into said mouth for retaining the tubing in the fitting, the effective diameter defined by the retaining means being less than the crest diameter and greater than the root diameter of the corrugated tubing;

said retaining means comprising a plurality of cleats which include a camming surface disposed at an angle with respect to said walls and converging inwardly toward said body, the thickness of the material defining the camming surface being substantially uniform over the length thereof, a locking face integral with said camming surface and extending between the inner extremity of said camming surface and said wall;

said locking face being disposed between adjacent crests of the corrugated tubing;

said locking face being disposed at a greater angle to the wall than the angle of the camming surface whereby less force is required to insert the tubing by moving the crest of the corrugated tubing over the camming surface and into the mouth than is required to remove the tubing by moving the crest over the locking face;

abutment means positioned axially inwardly from the locking face a distance at least as great as the distance between corresponding points on adjacent crests of the corrugated tubing;

said abutment means protruding radially inwardly a distance sufficient to engage a crest of the corrugated tubing to arrest inward axial movement thereof and terminating at a point which is outside of the flow path of the corrugated tubing as defined by the roots thereof.

2. The combination of claim 1 wherein the distance between the abutment means and the locking face is substantially a multiple of the spacing between the corrugations of the tubing.

3. The fitting of claim 1 wherein the plurality of retaining means are equally spaced circumferentially about the mouth.

4. The fitting of claim 1 wherein the plurality of cleats are generally coplanar.

5. The coupling of claim 1 wherein the mouth of the coupling is flared to assist in inserting it over tubing.

6. The coupling of claim 1 wherein the cylindrical body has corrugations.

7. The coupling of claim 5 wherein a flared mouth at the end of the coupling tapers into the camming surfaces on the cleats to provide a substantially continuous tapered surface.

8. The fitting of claim 6 further characterized in that the fitting is a Tee having three mouths.

* * * * *

Dedication 3,695,643.—*John D. Schmunk*, Findlay, Ohio. CORRUGATED TUBE COUPLING MEANS. Patent dated Oct. 3, 1972. Dedication filed May 23, 1974, by the assignee, *The Hancock Brick & Tile Company*.
Hereby dedicates to the Public the entire remaining term of said patent.
[*Official Gazette August 27, 1974.*]